(12) United States Patent
Dezonno et al.

(10) Patent No.: US 7,564,846 B2
(45) Date of Patent: Jul. 21, 2009

(54) METHOD OF COLLECTING COMMUNICATION SYSTEM INFORMATION

(76) Inventors: Anthony J. Dezonno, 233 Pinewood La., Bloomindale, IL (US) 60108; Roger A. Sumner, 1078 Shabbona Trail, Batavia, IL (US) 60510

( * ) Notice: Subject to any disclaimer, the term of this patent is extended or adjusted under 35 U.S.C. 154(b) by 671 days.

(21) Appl. No.: 10/929,872

(22) Filed: Aug. 30, 2004

(65) Prior Publication Data

US 2006/0045067 A1   Mar. 2, 2006

(51) Int. Cl.
*H04L 12/56* (2006.01)
(52) U.S. Cl. .................................................. 370/392
(58) Field of Classification Search ................ None
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,732,156 B2 | 5/2004 | Miloslavsky | |
| 7,058,728 B1* | 6/2006 | Eklund .................... | 709/247 |
| 2003/0156631 A1* | 8/2003 | McPherson et al. ........ | 375/152 |
| 2004/0184457 A1* | 9/2004 | Gregorio et al. ........... | 370/392 |
| 2006/0133386 A1* | 6/2006 | McCormack et al. ... | 370/395.52 |
| 2007/0091893 A1* | 4/2007 | Yazaki et al. .............. | 370/392 |

* cited by examiner

*Primary Examiner*—Jayanti K Patel
*Assistant Examiner*—Anthony Sol
(74) *Attorney, Agent, or Firm*—Husch Blackwell Sanders Welsh & Katz (57) ABSTRACT

A method and apparatus for collecting session information from a packet routing device. The method includes the steps of detecting a header packet of a communication session within a communication stream passing through the packet routing device where the communication stream contains packets from a plurality of users, comparing a type of the detected header packet with a list of headers that are to be collected and storing a message header of the header packet and only the message header in a file indexed by an identifier of the session when the header matches an entry within the list of headers to be collected.

25 Claims, 4 Drawing Sheets

METHOD OF COLLECTING COMMUNICATION SYSTEM INFORMATION

FIELD OF THE INVENTION

The field of the invention relates to communication systems and more particularly to the Internet.

BACKGROUND OF THE INVENTION

Automatic call distributors (ACDs) are known. Such systems are typically used by organizations to serve large numbers of callers through the Public Switched Telephone Network (PSTN). Typically, inbound calls are directed to a common telephone number of the organization and distributed to agents based upon some criteria (e.g., agent idle time).

In addition to handling inbound calls, ACDs may also process outbound calls. Typically, a controller monitors a workload of its agents. Where a workload of received calls falls below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

While automatic call distributors work relatively well for calls processed through the PSTN, they are not particularly well suited to handling Internet calls. Further, the standards that are used for processing switched circuit calls through the PSTN cannot be used within the Internet.

For example, measurements of system activity of an automatic call distributor would typically be based on circuit usage. However, in the case where agents handle contacts with clients through the Internet, via e-mail or instant messaging, there is no means of detecting this type of system activity. Because of the importance of communication through the Internet, a need exists for a method of tracking system activity that is not based upon circuit usage.

SUMMARY

A method and apparatus for collecting session information from a packet routing device. The method includes the steps of detecting a header packet of a communication session within a communication stream passing through the packet routing device where the communication stream contains packets from a plurality of users, comparing a type of the detected header packet with a list of headers that are to be collected and storing a message header of the header packet and only the message header in a file indexed by an identifier of the session when the header type matches an entry within the list of headers to be collected.

DETAILED DESCRIPTION OF AN ILLUSTRATED EMBODIMENT

Figure 1:
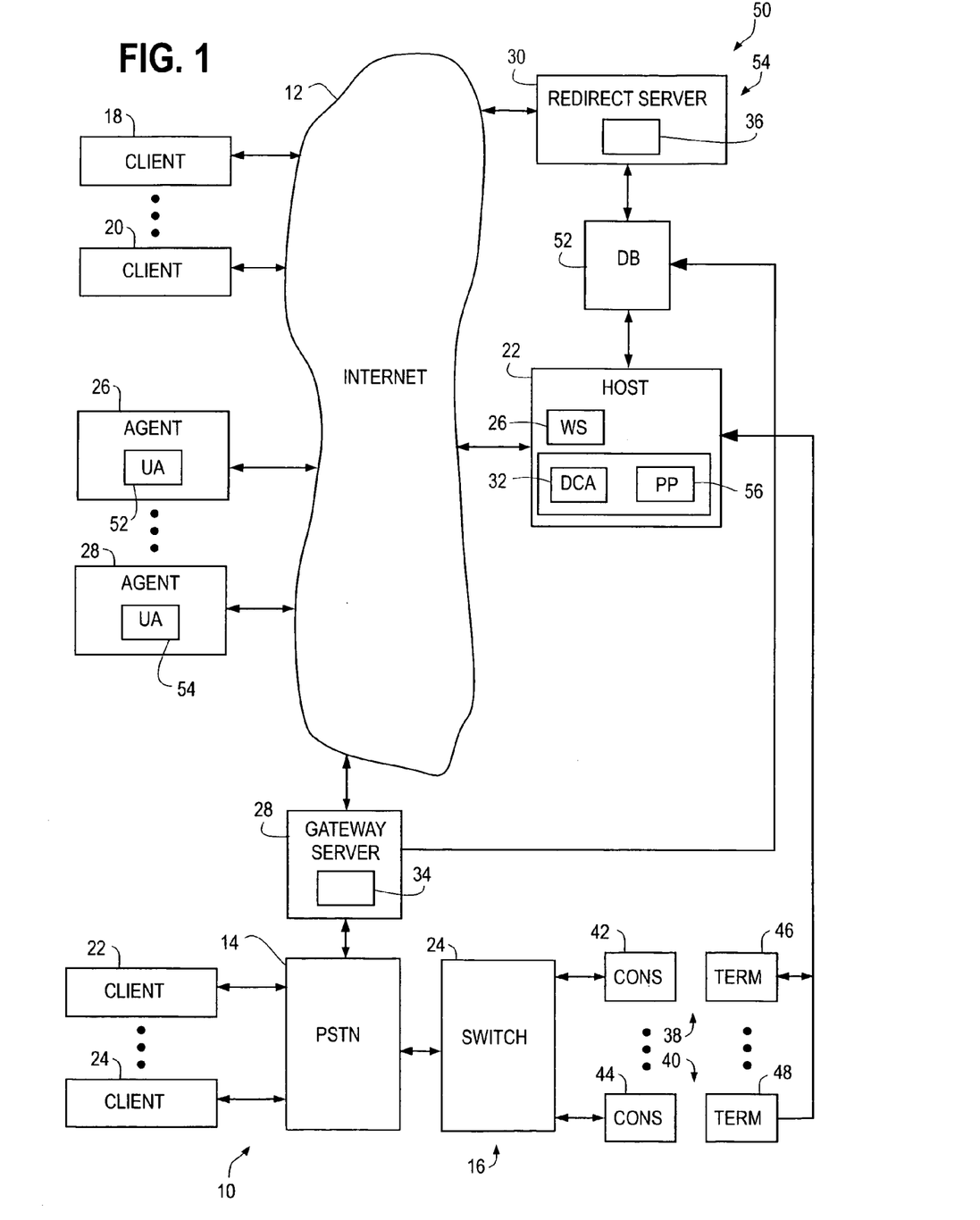
FIG. 1 is a block diagram of a communication system with a data collection system for collecting session information under an illustrated embodiment of the invention.

FIG. 1 is a block diagram of a communication system 10 under an illustrated embodiment of the invention. Included within, or used in conjunction with, the system 10 may be an automatic contact distribution system 16.

Also, included within the communication system 10 may be one or more data collection systems 50. The data collection systems 50 may be used to collect data about system use by users in a manner that is non-interfering with either system operation or user privacy.

One application for the data collection system 50 may be in the context of the automatic contact distribution system 16. In the context of the automatic contact distributor, the data collection system 50 may be used to collect any of a number of different types of information that is useful in the operation of the automatic contact distributor 16 (e.g., the number of agents available, the number of calls handled by each agent, the number of calls between agents, types of calls, the state of each call, events received by each agent, etc.).

While the data collection system 50 may be used in the context of the automatic contact distributor 16, it should be understood that the data collection system 50 may be used in any of a number of other, different applications. Other applications include local area networks (LANs), wide area networks (WANs), routers, servers, etc.

In general, the automatic contact distribution system 16 may be used by any of a number of different organizations (e.g., commercial, environmental, political, etc.) to advance the agenda of the organization. Access to the contact center 16 may be provided through the Internet under any of a number of different processes. In order to promulgate the agenda of the organization to its clients 18, 20, 22, 24 the organization may publish, by advertising or otherwise, one or more telephone numbers or universal resource locators (URLs) that identify communication paths to the organization.

The automatic contact distribution system 16 may include a host 22, a switch 24 and two or more agent stations 38, 40. Each agent station 38, 40 may consist of a telephone console 42, 44 and a terminal 46, 48. The consoles 42, 44 may be connected to the PSTN 14 through a switch 24. The terminals 46, 48 may be connected to the Internet 12 through a host 22. The agent stations 38, 40 may be used by agents (hereinafter referred to as "agents 38, 40") of the automatic contact distributor 16 to communicate with other users 18, 20, 22, 24 of the communication system 10.

Turning now to the communication system 10, in general, a communication path may be established between any two or more endpoints (e.g., users) of the system 10 under any of a number of different methodologies. For example, Internet users 18, 20, 38, 40 may exchange text and/or graphics via e-mail or instant messaging through the Internet 12. Similarly, telephone users 22, 24, 38, 40 may exchange voice information over switched circuit connections established through the PSTN 14.

Alternatively, Internet users 18, 20 may exchange voice information either among themselves or between a user 18, 20 and an agent 38, 40 through the Internet 12 using a Voice over Internet Protocol (VoIP) format. Similarly, Internet users 18, 20 and telephone users 22, 24 or agents 38, 40 may exchange voice information using switched circuits within the PSTN 14 and VoIP within the Internet 12 through a gateway 28.

For example, an Internet user (e.g., 18) having a Session Initiation Protocol (SIP) telephone may wish to place a call to a PSTN user (e.g., 22) or the organization using the automatic contact distribution system 16 (the organization and automatic contact distribution system 16 hereinafter sometimes together referred to as the "organization 16"). In order to place the call, the user 18 may enter a telephone number of the user 22 or organization 16 into his SIP telephone. Entry of a telephone number into the SIP telephone causes the telephone to compose a number of messages that ultimately result in a call be directed to the PSTN user 22 or organization 16 through the PSTN 14.

In order to contact the user 22 or organization 16, the SIP telephone of the user 18 may first locate a redirect server 30. To locate a redirect server 30, the telephone may first execute a DNS SRV query to locate the redirect server 30. Upon locating the redirect server, the telephone may compose a SIP INVITE that incorporates the entered telephone number and send the message to the redirect server 30. As used herein, an INVITE is an Internet SIP message composed in accordance with the Internet Engineering Task Force (IETF) RFC #3261.

The redirect server 30 may search a lookup table for a Universal Resource Locator (URL) or Universal Resource Indicator (URI) associated with the telephone number. Where the telephone number is of the organization 16, the URL or URI may identify the host 22 (if an agent 38, 40 also has a SIP telephone) or the gateway 28. Similarly, where the telephone number is of the user 22, the redirect server 30 may forward the INVITE to the gateway 28. The gateway 28, in turn, may function to transfer the telephone number to the PSTN 14 resulting in the creation of a switched circuit connection between the gateway 28 and user 22 or organization 16.

Upon completion of the connection between the gateway 28 and contact target 16, 22, the gateway may return a SIP/2.0 200 OK message that includes a URI of a port of the gateway 28 that has been allocated to handle the call. The SIP telephone of the user 18 may accept the URI of the gateway 28 and the user 18 and target 16, 22 can begin exchanging audio information using a switched circuit connection within the PSTN 14 and VoIP within the Internet 12.

Similarly, the user 22 or agent 38, 40 can dial a telephone number associated with the user 18. The PSTN 14 may accept the telephone number and set up a call connection through the gateway 28.

Upon receipt of the call at the gateway 18, the gateway may determine a call target via DNIS information delivered along with the call. To complete the call, the gateway 28 may compose a SIP INVITE using the telephone number associated with the user 18 and transfer the INVITE to the redirect server 30. The redirect server 30 may transfer the INVITE to the user 18. Upon receipt of the INVITE, the user 18 may accept the call and begin exchanging verbal information again using VoIP within the Internet 12 and a switched circuit within the PSTN 14.

In addition to using fixed system addresses (ports) within the system 10 (e.g., telephone numbers, URLs, etc.), a user may register to forward contacts to other system addresses. The user may forward contacts using a SIP REGISTER message to a "home" registrar (as defined by IETF #3261). The use of the SIP REGISTER messages allows a user to move among ports (e.g., from an office telephone to a home telephone, from an office e-mail address to a home e-mail address etc.).

Within the system 10, the contact distribution system 16 may be used for establishing contacts through the Internet 14 and/or PSTN 14 between agents 38, 40 and clients of the automatic contact distribution system (e.g., users 18, 20, 22, 24) and agents 18, 20. The automatic contact distribution system 16 may receive or place calls under SIP control through the Internet 12, the PSTN 12 or any other public or private network capable of handling communication traffic. The use of a SIP protocol allows two or more participants to establish a session wherein one or more media streams is exchanged with each participant. The media streams may be audio, video or any other combination of Internet-based communication mediums. The simultaneous setup and use of audio and video by the system 10 for one call between two or more parties is one example.

The system 16 may include a host 22 that places and receives calls and that distributes those calls to the agents 18, 20 of the organization. One or more agent selection applications may be provided within the host 22 for detecting calls and for selecting an agent for handling each call. The host 22 may function as a proxy server to route packets between clients 18, 20, 22, 24 and agents 38, 40.

Calls may be placed to and received from the organization 16 using any of a number of different communication devices. For example, (as mentioned above) one client 18 may place or receive calls through a SIP telephone. Alternatively, another client may place or receive calls using a personal computer 20 that is equipped with SIP communication software and that is connected directly to the Internet 12 or through an Internet Service. Provider (ISP).

Included within the system 10 may be one or more data collection applications 32, 34, 36 that may be disposed within one or more communication nodes (e.g., a host 22 of the automatic contact distribution system 16, redirect server 36, gateway 32, etc.). The data collection applications 32, 34, 36 together with a database 52 may form the data collection system 50. Alternatively, each data collection application 32, 34, 36 may be provided with its own database 52 and may form a separate data collection system 50.

To collect data, a data collection application 32, 34, 36 may monitor packets passing through a communication node (e.g., through the host 22, gateway 28, redirect server 30) from or to a user participating in a communication transaction (session). In general, the packets may be formatted under any of a number of different protocols (e.g., SIP, SKINNY, H.323, SGCP, etc.).

In one particular illustrated embodiment, data may be collected from communication transactions executed under a SIP format. SIP is an example of a packet based communication protocol and is defined in specifications such as RFC #3261 and RFC #3265. SIP is a point-to-point protocol that allows devices to communicate using a series of packets and packet types. The SIP protocol is composed of a start line, message header, an empty line and an optional message body. Header packets contain information about the communication session and are sent at the beginning of a communication session. A partial list of header packets are shown in Table I.

TABLE I

| HEADER | DESCRIPTION |
| --- | --- |
| AcceptEncodingHeader | This interface represents the Accept-Encoding request-header. |
| AcceptHeader | This interface represents and Accept request-header. |
| AcceptLanguageHeader | The Accept-Language header field is used in requests to indicate the preferred languages for reason phrases, session descriptions, or status responses carried as message bodies in the response. |
| AlertInfoHeader | When present in an INVITE request, the Alert-Info header field specifies an alternative ring tone to the UAS |
| AllowEventsHeader | This interface represents the Allow Events SIP header, as defined by RFC3265, this header is not part of RVD3261. |
| AllowHeader | The Allow header field lists the set of methods supported by the User Agent generating the message. |
| AuthenticationInfoHeader | The Authentication-Info header field provides for mutual authentication with HTTP Digest. |
| AuthorizationHeader | The Authorization header is used when a user agent wishes to authenticate itself with a server - usually, but not necessarily, after receiving an UNAUTHORIZED Response - by including an Authorization Header with the Request. |
| CallIdHeader | The Call-ID header field uniquely identifies a particular invitation or all registrations of a particular client. |
| CallInfoHeader | The Call-Info header field provides additional information about the caller or callee, depending on whether it is found in a request or response. |
| ContactHeader | A Contact header field value provides a URI whose meaning depends on the type of request or response it is in. |
| ContentDispositionHeader | The Content-Disposition header field describes how the message body or, for multipart messages, a message body part is to be interpreted by the UAC or UAS. |
| ContentEncodingHeader | A Content Encoding Header is used as a modifier to the "media-type". |
| ContentLanguageHeader | A Content-Language header field is used to indicate the language of the message body. |
| ContentLengthHeader | The Content-Length header field indicates the size of the message-body in decimal number of octets, sent to the recipient. |
| ContentTypeHeader | The Content-Type header field indicates the media type of message-body sent to the recipient. |
| CSeqHeader | A CSeq header field in a request contains a single decimal sequence number and the request method. |
| DateHeader | The Date header field reflects the time when the request of response is first sent. |
| Encoding | This interface represents encoding methods for any header that contains an encoding value. |
| ErrorInfoHeader | The Error-Info header field provides a pointer to additional information about the error status response. |
| EventHeader | This interface represents the Event SIP header, as defined by RFC3265, this header is not part of RFC3261. |
| ExpiresHeader | The Expires header field gives the relative time after which the message (or content) expires. |
| ExtensionHeader | This interface represents an Extension SIP header that is not currently defined by JAIN SIP. |
| FromHeader | The From header field indicates the logical identity of the initiator of the request, possibly the user's address-of-record. |
| Header | This interface is the super interface of all SIP headers supported explicitly by JAIN SIP. |
| HeaderAddress | This interface represents methods for manipulating Address object values for any header that contains an Address value. |
| HeaderFactory | This interface provides factory methods that allow an application to create Header object from a particular implementation of JAIN SIP |
| InReplyToHeader | The In-Reply-To header field enumerates the Call-Ids that this call references to returns. |
| MaxForwardsHeader | The Max-Forwards header field must be used with an SIP method to limit the number of proxies or gateways that can forward the request to the next downstream server. |

TABLE I-continued

| HEADER | DESCRIPTION |
| --- | --- |
| MediaType | This interface represents media type methods for any header that contain content type and content sub-type values. |
| MimeVersionHeader | SIP messages MAY include a single MIME-Version general-header field to indicate what version of the MIME protocol was used to construct the message. |
| MinExpiresHeader | The Min-Expires header field conveys the minimum refresh interval supported for soft-state elements managed by that server. |
| OptionTag | This interface represents methods for manipulating Option Tags values for any header that contains an Option Tag value. |
| OrganizationHeader | The Organization Header conveys the name of the organization to which the entity issuing the Request or Response belongs. |
| Parameters | This interface defines methods for accessing generic parameters for Headers that contain generic parameter values. |
| PriorityHeader | The Priority header field indicates the urgency of the request as perceived by the client. |
| ProxyAuthenticateHeader | A Proxy-Authenticate header field value contains an authentication challenge. |
| ProxyAuthorizationHeader | The Proxy-Authorization header field allows the client to identify itself (or its user) to a proxy that requires authentication. |
| ProxyRequireHeader | The Proxy-Require header field is used to indicate proxy-sensitive features that must be supported by the proxy. |
| RAckHeader | This interface represents the Rack header, as defined by RFC3262, this header is not part of RFC3261. |
| ReasonHeader | This interface represents the Reason header, as defined by RFC3326, this header is not part of RFC3261. |
| RecordRouteHeader | The Record-Route header field is inserted by proxies in a request to force future requests in the dialog to be routed through the proxy. |
| ReferToHeader | This interface represents the Refer To SIP header, as defined by RFC3515, this header is not part of RFC3261 |
| ReplyToHeader | The Reply-To header field contains a logical return URI that may be different from the From header field. |
| RequireHeader | The Require header field is used by UACs to tell UASs about options that the UAC expects the UAS to support in order to process the request. |
| RetryAfterHeader | The Retry-After header field identifies the time to retry the request after receipt of the response. |
| RouteHeader | The Route header field is used to force routing for a request through the listed set of proxies. |
| RSeqHeader | This interface represents the RSeq header, as defined by RFC3262, this header is not part of RFC3261. |
| ServerHeader | The Server header field contains information about the software used by the UAS to handle the request. |
| SubjectHeader | The Subject header field provides a summary or indicates the nature of the call, allowing call filtering without having to parse the session description. |
| SubscriptionStateHeader | This interface represents the Subscription State header, as defined by RFC3265, this header is not part of RFC3261. |
| SupportedHeader | The Supported header field enumerates all the extensions supported by the UAC or UAS. |
| TimeStampHeader | the Timestamp header field describes when the UAC sent he request to the UAS. |
| ToHeader | The To header field first and foremost specifies the desired "logical" recipient of the request, or the address-of-record of the user or resource that is the target of this request. |
| UnsupportedHeader | The Unsupported header field lists the features not supported by the UAS. |
| UserAgentHeader | The User-Agent header field contains information about the UAC originating the request. |
| ViaHeader | The Via header field indicates the transport used for the transaction and identifies the location where the response is to be sent. |
| WarningHeader | The Warning header field is used to carry additional information about the status of a response. |
| WWWAuthenticateHeader | This interface represents the WWW-Authenticate response-header. |

Prior users of the SIP protocol have retained the header information for short periods for establishing a connection or for processing of a particular transaction and have discarded the information once the transaction was over. These prior solutions do not retain header information after a transaction or a call is complete nor do they create a database of collected header information which can be used for marketing or communications planning and processing purposes.

Figure 2:
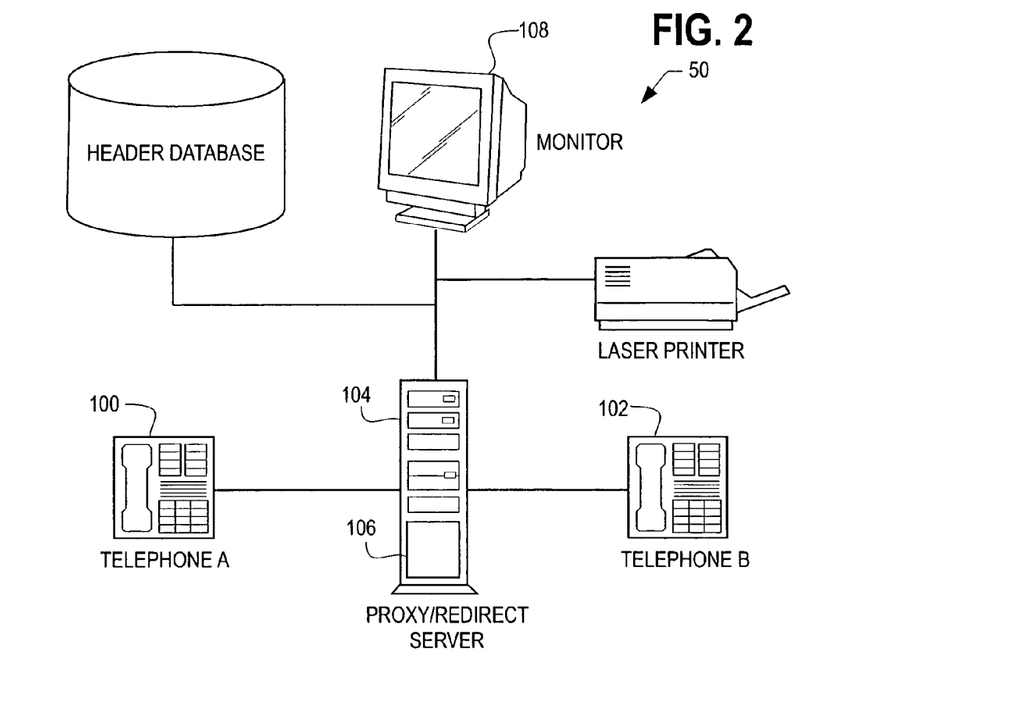
FIG. 2 is a simplified block diagram of the system of FIG. 1.

FIG. 2 is a simplified diagram of the data collection system 50 of FIG. 1. As shown in FIG. 2, a proxy/redirect server 104 functions to route packets between telephone A 100 and telephone B 102. The proxy/redirect server 104 of FIG. 2 may be any or all of the group consisting of the gateway 28, the host 22 and the redirect server 30 of FIG. 1. Telephone A 100 and telephone B 102 may be any of the clients 18, 20, 22, 24 and/or agents 38, 40 of FIG. 1. It should be noted that users of the telephones 100, 102 may communicate directly through a redirect server in a redirect mode or they may communicate in a proxy mode where a server application (e.g., within the host 22) filters and virtually redirects packets.

Included within the proxy/redirect server 104 may be a data collection application 106. The data collection application 106 may represent any one of (or all) of the data collection applications 32, 34, 36 shown in FIG. 1.

Figure 3:
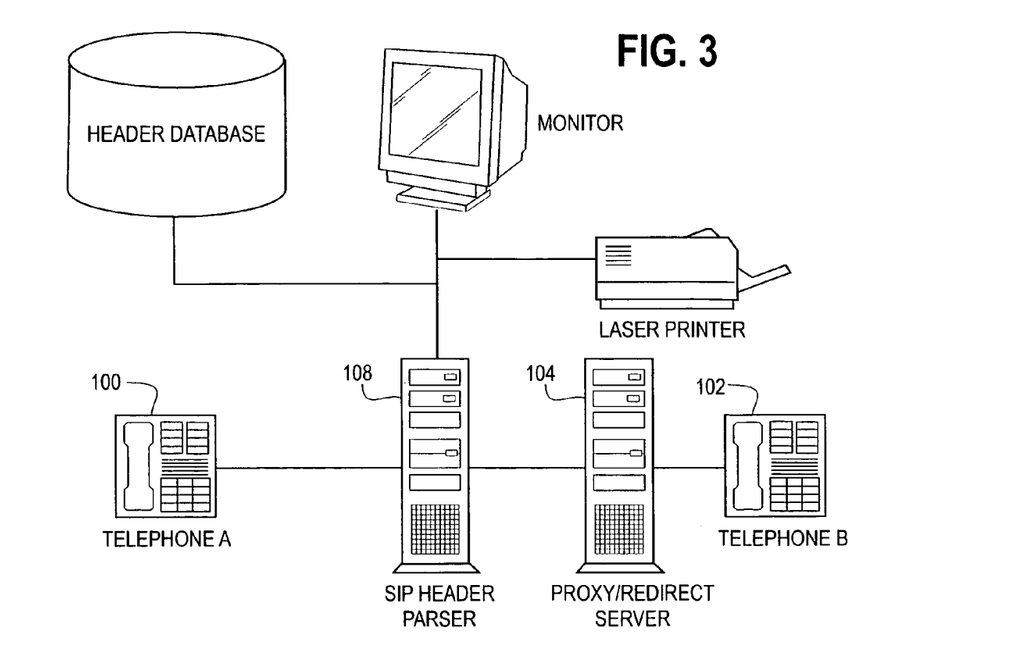
FIG. 3 is a simplified block diagram of FIG. 1 under an alternate embodiment.

In the approach of FIG. 2, the data collection application 106 may collect data from any (or all) of the group consisting of the proxy server (host 22), the redirect server 30 and gateway 28 depending upon the scope of data collection desired. Alternatively, a separate server 108 may be assigned to monitor the SIP communication traffic as shown in FIG. 3.

Figure 4:
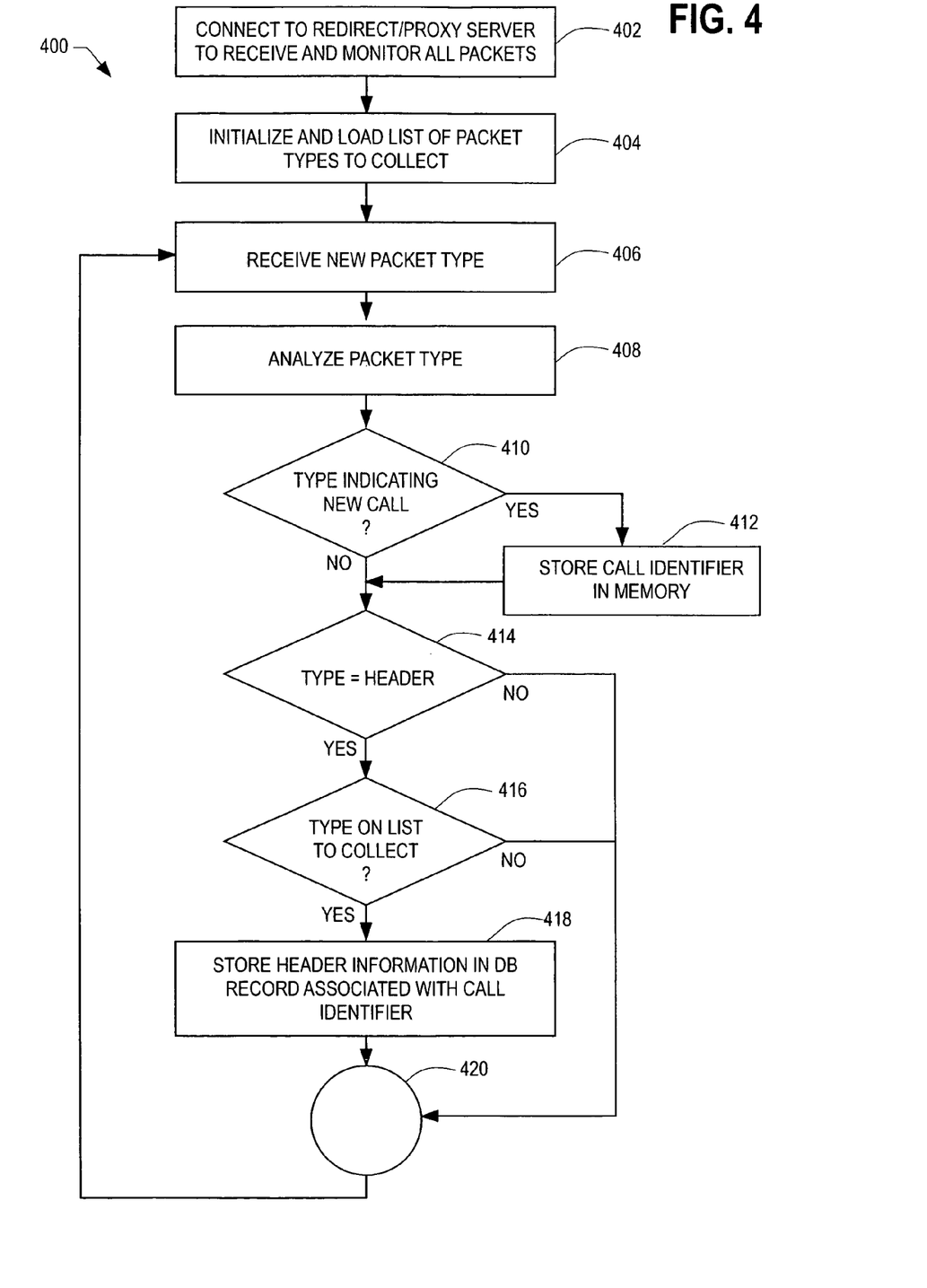
FIG. 4 is a flow chart of the collection of session information used by the system of FIG. 1.
Figure 5:
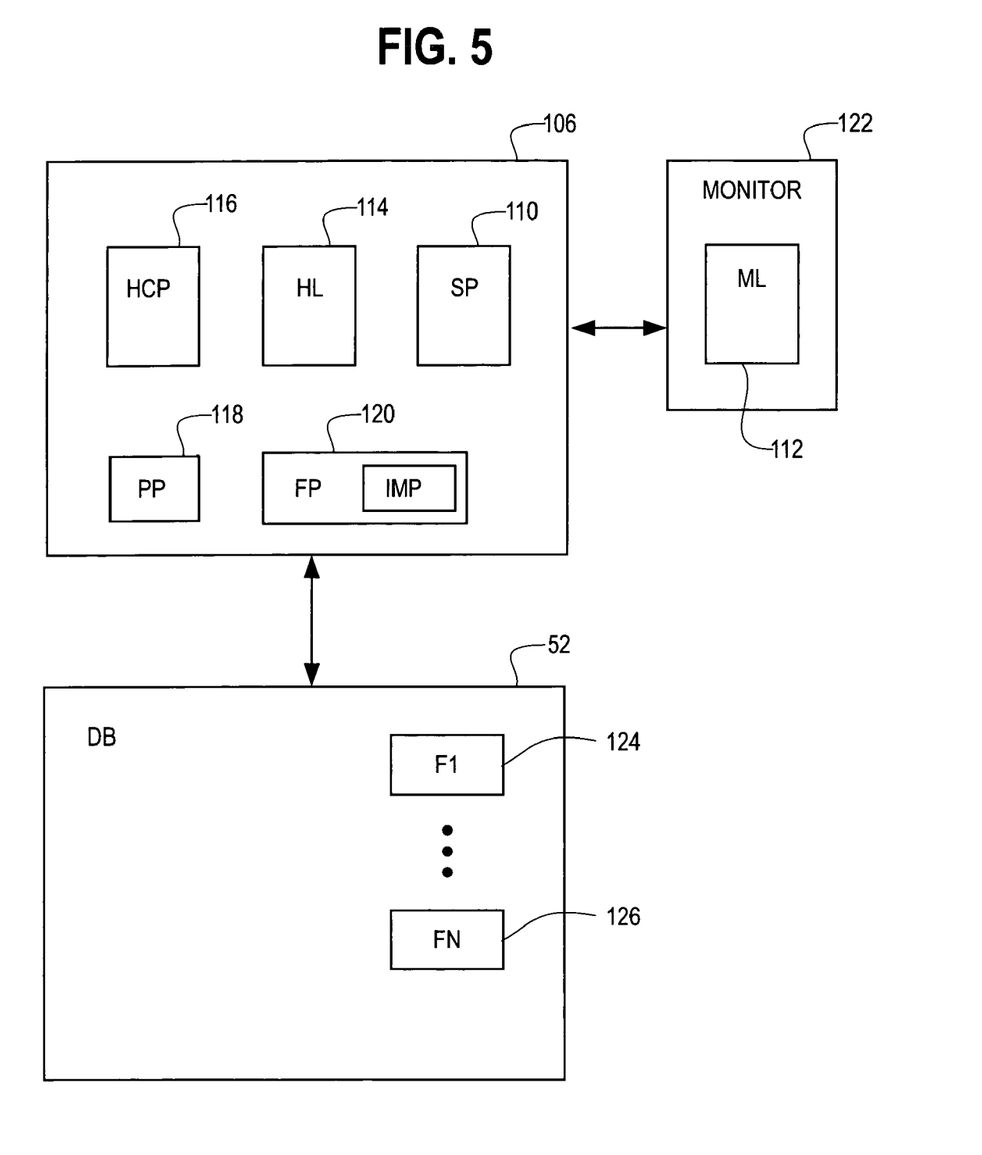
FIG. 5 is a block diagram of a data collection application that may be used by the system of FIG. 1.

FIG. 4 is a flow chart of the data collection process that occurs in the data collection application 106 (data collection system 50). FIG. 5 is a schematic that shows the flow of data through the data collection application 106.

Turning next to the use of the data collection system 50, in general, an explanation will be provided as to how the system 50 may be used. In this regard, a selection processor 110 may present a list of headers 112 on a terminal 122 of a supervisor. The supervisor may select the headers that should be collected and the selected headers are saved in a header list 114.

Once the header list 114 has been created, the data collection application 106 may connect to the server 22, 28, 30 and receive and monitor the packet stream 402 (FIG. 4). The monitoring of packets may occur in a manner similar to that used by sniffers in firewalls.

As the packet stream is monitored, a packet parser 118 functions to receive 406 and capture each new packet type (message header) from the packet stream. A header comparison processor 116 may function to compare the packet type with the header list 114 to first analyze 408 and determine what type of packet is involved and then to determine what to do in response to receipt of the packet.

For example, if the comparison processor 114 should determine that the header is of a type indicating a new call 410, then the comparison processor 114 may transfer the header to a file processor 120. The file processor 120 may use the identification of the packet as the first packet of a new call to open a new record for the session that is indexed by a session identifier and may store 412 the record 124, 126 in memory 52. The file processor 120 may also include a timer to close a file that has not been accessed for a predetermined time period.

The session identifier may be a URL or URI of one of the parties to the call or some other randomly assigned identifier assigned by the application 106. Where a randomly assigned identifier is used, then a temporary port identifier may be saved to the file to identify subsequent transmission from the same source/destination.

The data collection system 50 is non-interfering with regard to system operation because it simply detects headers without interfering with header transmission. The data collection system 50 is non-interfering with user privacy because it doesn't retain any user information. In effect, the only information retained by the data collection system 50 relates to system commands directed to the communication system.

Once the type is determined by the comparator, the comparator 116 compares the type with the entries within the list of types 114. If the type is within the list of headers to be collected, then the comparator 116 saves the header information into the database 52 under the previously captured identifier of the new call. If the header is not on the list of headers to be captured, then the comparator 116 discards 420 the header and the process repeats.

A specific embodiment of a method and apparatus for collecting session information has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of collecting session information in a database from a packet routing device, such method comprising the steps of:

detecting a header packet of a communication session within a communication stream passing through the packet routing device where the communication stream contains packets from a plurality of users;

presenting a proposed header list on a terminal of a supervisor, the supervisor selecting headers to be collected and storing the headers selected in a list of headers;

comparing a type of the detected header packet with the list of headers that are to be collected in the database; and storing in the data base a message header of the header packet and only the message header in a file indexed by an identifier of the session when the header type matches an entry within the list of headers to be collected.

2. The method of collecting session information as in claim 1 wherein the step detecting the packet further comprising determining from the header type that the packet is a contact setup request for establishing a new communication session between first and second users.

3. The method of collecting session information as in claim 2 further comprising opening the file for collecting information in response to determining that the packet is a contact setup request using a file identifier consisting of an identifier of one of the first and second users.

4. The method of collecting session information as in claim 1 wherein the step of detecting a header packet further comprises retrieving a packet from the communication stream and recovering a source identifier and message header from the retrieved packet.

5. The method of collecting session information as in claim 4 wherein the step of storing the header further comprising only storing the header in the file when a source or destination identifier of the packet indicates that a file has already been opened and the message header matches an entry within the list of message headers to be collected.

6. The method of collecting session information as in claim 1 further comprising closing the file after a predetermined period within which no activity is detected.

7. The method of collecting session information as in claim 1 further comprising defining the header to be under a SIP format.

8. The method of collecting session information as in claim 1 further comprising defining the header to be under a SKINNY format.

9. The method of collecting session information as in claim 1 further comprising defining the header to be under at least one of a H.323 format and a SGCP format.

10. An apparatus for collecting session information in a database from a packet routing device, such apparatus comprising:
  means for detecting a header packet of a communication session within a communication stream passing through the packet routing device where the communication stream contains packets from a plurality of users and for retrieving a packet from the communications stream and recovering a source identifier and message header from the retrieved packet;
  means for comparing a type of the detected header packet with a list of headers that are to be collected in the database; and
  means for storing in the database a message header of the header packet and only the message header in a file indexed by an identifier of the session when the header type matches an entry within the list of headers to be collected and when a source or destination identifier of the packet indicates that the file has already been opened and the message header matches an entry within the list of message headers to be collected.

11. An apparatus for collecting session information as in claim 10 wherein the means for detecting the packet further comprising means for determining from the header that the packet is a contact setup request for establishing a new communication session between first and second users.

12. The apparatus for collecting session information as in claim 11 further comprising means for opening the file for collecting information using a file identifier consisting of an identifier of one of the first and second user users.

13. The apparatus for collecting session information as in claim 10 further comprising means for closing the file after a predetermined period within which no activity is detected.

14. The apparatus for collecting session information as in claim 10 further comprising defining the header to be under a SIP format.

15. The apparatus for collecting session information as in claim 10 further comprising defining the header to be under a SKINNY format.

16. The apparatus for collecting session information as in claim 10 further comprising defining the header to be under at least one of a H.323 format and a SGCP format.

17. The apparatus for collecting session information as in claim 10 further comprising presenting a proposed header list on a terminal of a supervisor, the supervisor selecting headers to be collected and storing the headers selected as the list of headers that are to be collected.

18. The apparatus for collecting session information from a packet routing device, such apparatus comprising:
  a data collection application that identifies predetermined header packets within a communication stream passing through the packet routing device where the communication stream contains packets from a plurality of users;
  a supervisor terminal for displaying a list of proposed headers to permit a supervisor to select a list of headers to be collected; and
  a database that stores message headers of the identified header packets and only the message header in a file indexed by an identifier of the session when a header type matches an entry within the list of headers to be collected.

19. The apparatus for collecting session information as in claim 18 wherein the data collection application further comprising a comparator that determines from the header that the packet is a contact setup request for establishing a new communication session between first and second users.

20. The apparatus for collecting session information as in claim 19 further comprising a file processor that opens the file for collecting information in response to determining that the packet is a contact setup request using a file identifier consisting of an identifier of one of the first and second users.

21. An apparatus for collecting session information as in claim 18 wherein the data collection application further comprises a parser that retrieves a packet from the communication stream and recovers a source identifier and message header from the retrieved packet.

22. The apparatus for collecting session information as in claim 18 further comprising a timer that closes the file after a predetermined period within which no activity is detected.

23. The apparatus for collecting session information as in claim 18 further comprising defining the header to be under a SIP format.

24. The apparatus for collecting session information as in claim 18 further comprising defining the header to be under at least one of a SKINNY format and a H.323 format.

25. The apparatus for collection session information as in claim 18 further comprising defining the header to be under a SGCP format.

* * * * *